(12) United States Patent
Liu et al.

(10) Patent No.: US 11,747,674 B2
(45) Date of Patent: Sep. 5, 2023

(54) BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Lei Liu, Beijing (CN); Yanjun Sun, Beijing (CN); Zeyu Song, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 7 days.

(21) Appl. No.: 17/638,792

(22) PCT Filed: Apr. 14, 2021

(86) PCT No.: PCT/CN2021/087163
§ 371 (c)(1),
(2) Date: Feb. 25, 2022

(87) PCT Pub. No.: WO2021/227752
PCT Pub. Date: Nov. 18, 2021

(65) Prior Publication Data
US 2022/0276531 A1    Sep. 1, 2022

(30) Foreign Application Priority Data
May 13, 2020   (CN) .......................... 202010403054.8

(51) Int. Cl.
*G02F 1/00*      (2006.01)
*G02F 1/13357*   (2006.01)
*G02F 1/1335*    (2006.01)

(52) U.S. Cl.
CPC .. *G02F 1/133605* (2013.01); *G02F 1/133608* (2013.01); *G02F 1/133612* (2021.01)

(58) Field of Classification Search
None
See application file for complete search history.

(56) References Cited

U.S. PATENT DOCUMENTS

| 2011/0255033 A1 | 10/2011 | Huang et al. |
| 2016/0085015 A1* | 3/2016 | Kim ..................... G02B 6/0021 |
| | | 362/621 |

(Continued)

FOREIGN PATENT DOCUMENTS

| CN | 102865527 A | 1/2013 |
| CN | 203771226 U | 8/2014 |

(Continued)

OTHER PUBLICATIONS

Notification to Grant Patent Right for Invention for Chinese Patent Application No. 202010403054.8 issued by the Chinese Patent Office dated Oct. 11, 2021.

*Primary Examiner* — Gerald J Sufleta, II
(74) *Attorney, Agent, or Firm* — IP&T Group LLP

(57) ABSTRACT

A backlight module includes a light bar, a light guide plate located on a light exit side of the light bar, a reflective strip, and at least two cushion pads. The light guide plate includes a first side surface away from the light bar. The reflective strip is attached to the first side surface. Each cushion pad includes a first positioning portion and an avoiding portion. An orthographic projection of the reflective strip on the first side surface is located outside an orthographic projection of the first positioning portion on the first side surface, and is partially overlapped with an orthographic projection of the avoiding portion on the first side surface. The first positioning portion is in surface contact with a portion of the first (Continued)

side surface that is non-covered by the reflective strip. The avoiding portion and the reflective strip have a first interval therebetween.

17 Claims, 4 Drawing Sheets

(56) References Cited

U.S. PATENT DOCUMENTS

| | | | |
|---|---|---|---|
| 2016/0187569 A1 | 6/2016 | Yu et al. | |
| 2016/0209582 A1* | 7/2016 | Kawata | G02F 1/13452 |

FOREIGN PATENT DOCUMENTS

| | | | | |
|---|---|---|---|---|
| CN | 104570478 A | | 4/2015 | |
| CN | 104806921 A | | 7/2015 | |
| CN | 206378666 U | | 8/2017 | |
| CN | 206990995 U | | 2/2018 | |
| CN | 207164420 U | | 3/2018 | |
| CN | 207636895 U | | 7/2018 | |
| CN | 110095906 A | | 8/2019 | |
| CN | 110161753 A | * | 8/2019 | ........... G02B 6/0066 |
| CN | 110161753 A | | 8/2019 | |
| CN | 209560128 U | * | 10/2019 | |
| CN | 209560128 U | | 10/2019 | |
| CN | 111458784 A | | 7/2020 | |
| KR | 10-2016-0083248 A | | 7/2016 | |

* cited by examiner

BACKLIGHT MODULE AND DISPLAY DEVICE

CROSS-REFERENCE TO RELATED APPLICATIONS

This application is a national phase entry under 35 USC 371 of International Patent Application No. PCT/CN 2021/087163 filed on Apr. 14, 2021, which claims priority to Chinese Patent Application No. 202010403054.8, filed on May 13, 2020, which are incorporated herein by reference in their entirety.

TECHNICAL FIELD

The present disclosure relates to the field of display technologies, and in particular, to a backlight module and a display device.

BACKGROUND

Liquid crystal displays (LCDs) have advantages of low radiation, small volume, and low power consumption, and are able to be widely used in display devices such as notebook computers, personal digital assistants (PDAs), flat panel televisions, and mobile phones.

The liquid crystal display generally includes a liquid crystal display panel and a backlight module. The backlight module is provided on a back surface of the liquid crystal display panel, and can provide uniformly diffused light with a certain brightness to the liquid crystal display panel, so as to realize color display by using the liquid crystal display panel.

SUMMARY

Embodiments of the present disclosure provide following technical solutions.

In an aspect, a backlight module is provided. The backlight module includes a light bar, a light guide plate, a reflective strip, and at least two cushion pads. The light guide plate is located on a light exit side of the light bar. The light guide plate includes a first side surface away from the light bar. The reflective strip is attached to the first side surface. Each cushion pad includes a first positioning portion and an avoiding portion disposed on the first positioning portion. An orthographic projection of the reflective strip on the first side surface is located outside an orthographic projection of the first positioning portion on the first side surface, and the orthographic projection of the reflective strip on the first side surface is partially overlapped with an orthographic projection of the avoiding portion on the first side surface. The first positioning portion is in surface contact with a portion of the first side surface that is non-covered by the reflective strip. The avoiding portion and the reflective strip have a first interval therebetween.

In some embodiments, the avoiding portion is located on a side of the first positioning portion proximate to a light exit surface of the light guide plate.

In some embodiments, extending directions of the first positioning portion and the avoiding portion are parallel to an extending direction of the reflective strip. A length of the reflective strip along the extending direction of the reflective strip is same as a length of the first side surface along the same direction.

In some embodiments, the light guide plate further includes a second side surface and a third side surface that intersect the first side surface. A number of the cushion pads is two. Each cushion pad further includes a second positioning portion. A second positioning portion of one cushion pad is in surface contact with the second side surface, and a second positioning portion of another cushion pad is in surface contact with the third side surface.

In some embodiments, the backlight module further includes at least one dam. The light guide plate further includes a fourth side surface parallel to the first side surface. The at least one dam is disposed on a surface of the light bar proximate to the light guide plate. A surface of the at least one dam proximate to the light guide plate is in surface contact with the fourth side surface.

In some embodiments, the light bar includes a circuit board and a plurality of light sources. The plurality of light sources are disposed on a surface of the circuit board proximate to the light guide plate, and are connected to a lighting circuit in the circuit board. The at least one dam and the plurality of light sources are located on a same side of the circuit board, and the at least one dam is fixedly connected to the circuit board. A height of the light sources exceeding the circuit board is less than a height of the at least one dam exceeding the circuit board, so that the plurality of light sources and the fourth side surface have a second interval therebetween.

In some embodiments, both the first positioning portion and the avoiding portion are connected to the second positioning portion smoothly.

In some embodiments, the first positioning portion, the avoiding portion, and the second positioning portion are of an integrated structure.

In some embodiments, a rigidity of each cushion pad is less than a rigidity of the light guide plate.

In some embodiments, the reflective strip includes a reflective body and two extending portions. One of the two extending portions is disposed on a side of the reflective body along an extending direction of the reflective body, and another one of the two extending portions is disposed on an opposite side of the reflective body along the extending direction of the reflective body. An orthographic projection of each extending portion on the first side surface is located within an orthographic projection of a corresponding avoiding portion on the first side surface. The extending portion and the corresponding avoiding portion have the first interval therebetween.

In some embodiments, a rigidity of each dam is less than a rigidity of the light guide plate.

In some embodiments, the at least one dam includes two dams. A distance between each dam and an edge of the circuit board proximate to the dam along an extending direction of the circuit board is less than a distance between the two dams.

In some embodiments, the at least one dam includes more than two dams that are uniformly distributed along an extending direction of the circuit board.

In some embodiments, the backlight module further includes a bottom frame, and the bottom frame includes a back plate and a side wall located on a periphery of the back plate. The light guide plate is located on the back plate, and the light exit surface of the light guide plate is parallel to the back plate.

In some embodiments, the at least two cushion pads are disposed between the light guide plate and the bottom frame, and a portion of each cushion pad away from the first side surface is fixedly connected to the side wall of the bottom frame.

In some embodiments, a hardness of the cushion pad ranges from 50 HA to 60 HA, inclusive.

In another aspect, a display device is provided. The display device includes the backlight module in some of the above embodiments and a liquid crystal display panel disposed on a light exit side of the backlight module.

BRIEF DESCRIPTION OF THE DRAWINGS

In order to describe technical solutions in some embodiments of the present disclosure more clearly, accompanying drawings to be used in the description of some embodiments will be introduced briefly below. Obviously, the accompanying drawings to be described below are merely accompanying drawings of some embodiments of the present disclosure, and a person of ordinary skill in the art may obtain other drawings according to these drawings.

DETAILED DESCRIPTION

Technical solutions in some embodiments of the present disclosure will be described clearly and completely with reference to the accompanying drawings in some embodiments of the present disclosure below. Obviously, the described embodiments are merely some but not all embodiments of the present disclosure. All other embodiments obtained by a person of ordinary skill in the art based on some embodiments of the present disclosure shall be included in the protection scope of the present disclosure.

Below, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

The term "substantially" or "approximately" includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing.

Therefore, the regions shown in the accompanying drawings are schematic in nature, and their shapes are not intended to show actual shapes of the regions in a device, and are not intended to limit the scope of the exemplary embodiments.

Embodiments of the present disclosure provide a display device, which is, for example, a product or a component with a display function, such as a liquid crystal display, a television, a mobile phone, a tablet computer, a notebook computer, an electronic paper, a digital photo frame, or a navigator.

Figure 1:
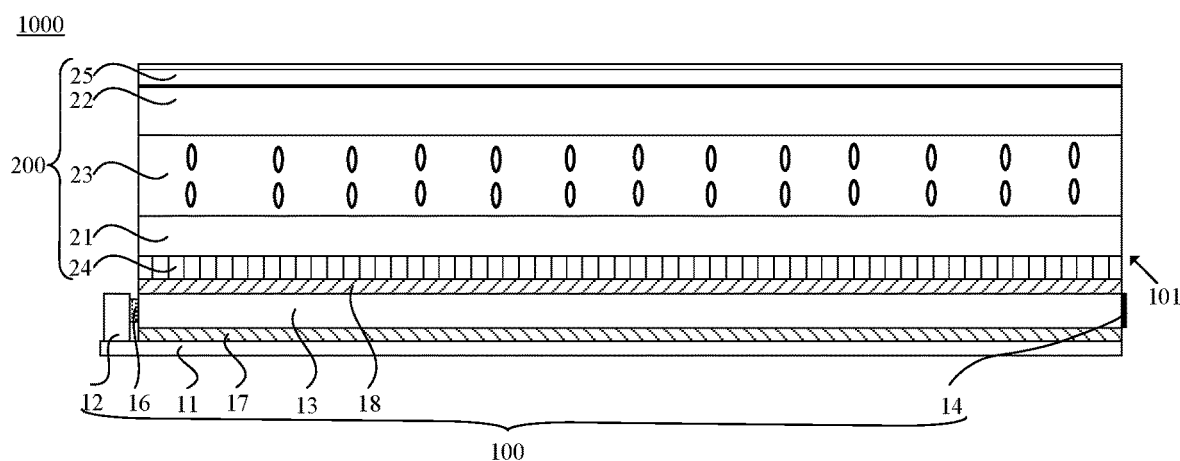
FIG. 1 is a schematic structural diagram of a display device, in accordance with embodiments of the present disclosure.

For example, the display device is a liquid crystal display device. As shown in FIG. 1, the display device 1000 includes a liquid crystal display panel 200 and a backlight module 100. The liquid crystal display panel 200 is provided on a light exit side 101 of the backlight module 100, and the backlight module 100 is capable of providing light for the liquid crystal display panel 200.

Figure 2:
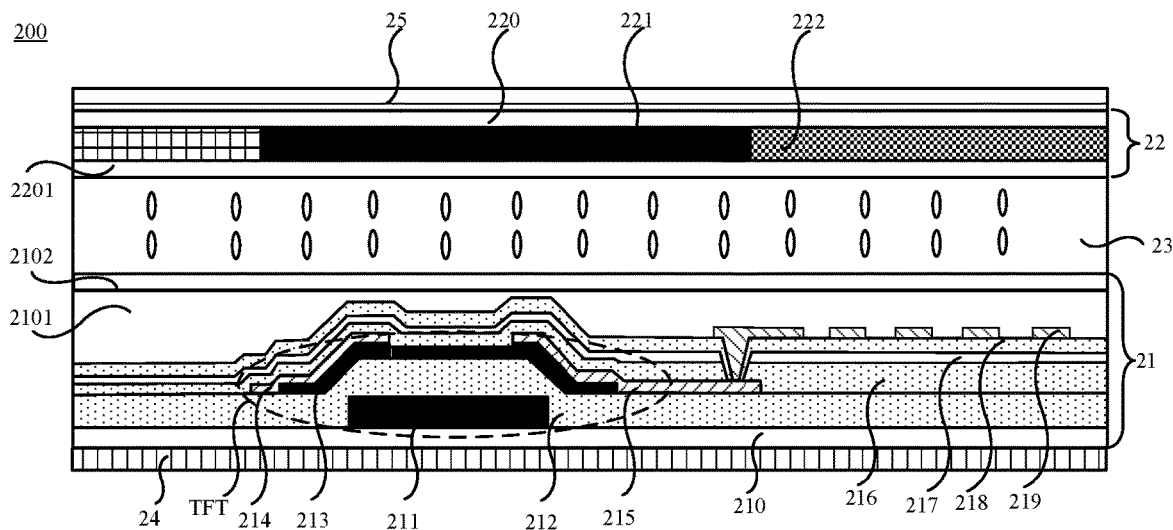
FIG. 2 is a partial sectional view of a liquid crystal display panel, in accordance with embodiments of the present disclosure.

As shown in FIG. 2, a main structure of the liquid crystal display panel 200 includes an array substrate 21, an opposite substrate 22, and a liquid crystal layer 23 disposed between the array substrate 21 and the opposite substrate 22.

The array substrate 21 includes a first substrate 210 and a plurality of sub-pixels arranged in an array on the first substrate 210. Each sub-pixel includes a pixel driving circuit and a pixel electrode 219 that are disposed on the first substrate 210. The pixel driving circuit includes thin film transistors TFT. The thin film transistor TFT includes a gate 211, a gate insulating layer 212, an active layer 213, a source 214, and a drain 215. The source 214 and the drain 215 are in contact with the active layer 213. The pixel electrode 219 in each sub-pixel is connected to the drain 215 of the thin film transistor TFT in the pixel driving circuit in the same sub-pixel.

The opposite substrate 22 includes a second substrate 220, and both black matrix patterns 221 and color filter patterns 222 disposed on the second substrate 220, as shown in FIG. 2. In this case, the opposite substrate 22 may also be referred to as a color film (also called color filter, CF) substrate. The color filter pattern 222 at least includes three primary color photoresist units, such as a red photoresist unit, a green photoresist unit, and a blue photoresist unit.

In some embodiments, the array substrate 21 further includes a common electrode 217 disposed on the first substrate 210.

For example, the pixel electrode 219 and the common electrode 217 are arranged in a same layer. In this case, each of the pixel electrode 219 and the common electrode 217 is a comb-shaped electrode including a plurality of strip-shaped sub-electrodes.

For example, the pixel electrode 219 and the common electrode 217 are arranged in different layers. In this case, as shown in FIG. 2, a first insulating layer 218 is provided between the pixel electrode 219 and the common electrode 217. In a case where the common electrode 217 is located between the thin film transistor TFT and the pixel electrode 219, as shown in FIG. 2, a second insulating layer 216 is further provided between the common electrode 217 and the thin film transistor TFT.

In some other embodiments, the opposite substrate 22 further includes a common electrode disposed on the second substrate 220. In a case where the opposite substrate 22 includes the black matrix patterns 221 and the color filter patterns 222, the common electrode is provided on a side of the black matrix patterns 221 and the color filter patterns 222 away from the second substrate 220.

In addition, the array substrate 21 further includes a first planarization layer 2101 covering surfaces of the pixel driving circuits and the pixel electrodes 219, and a first alignment layer 2102 disposed on a surface of the first planarization layer 2101 away from the first substrate 210. The opposite substrate 22 further includes a second alignment layer 2201 covering surfaces of the black matrix patterns 221 and the color filter patterns 222.

In some embodiments, the liquid crystal display panel 200 further includes a first polarizer 24 disposed on a side of the array substrate 21 away from the liquid crystal layer 23, and a second polarizer 25 disposed on a side of the opposite substrate 22 away from the liquid crystal layer 23.

Figure 3:
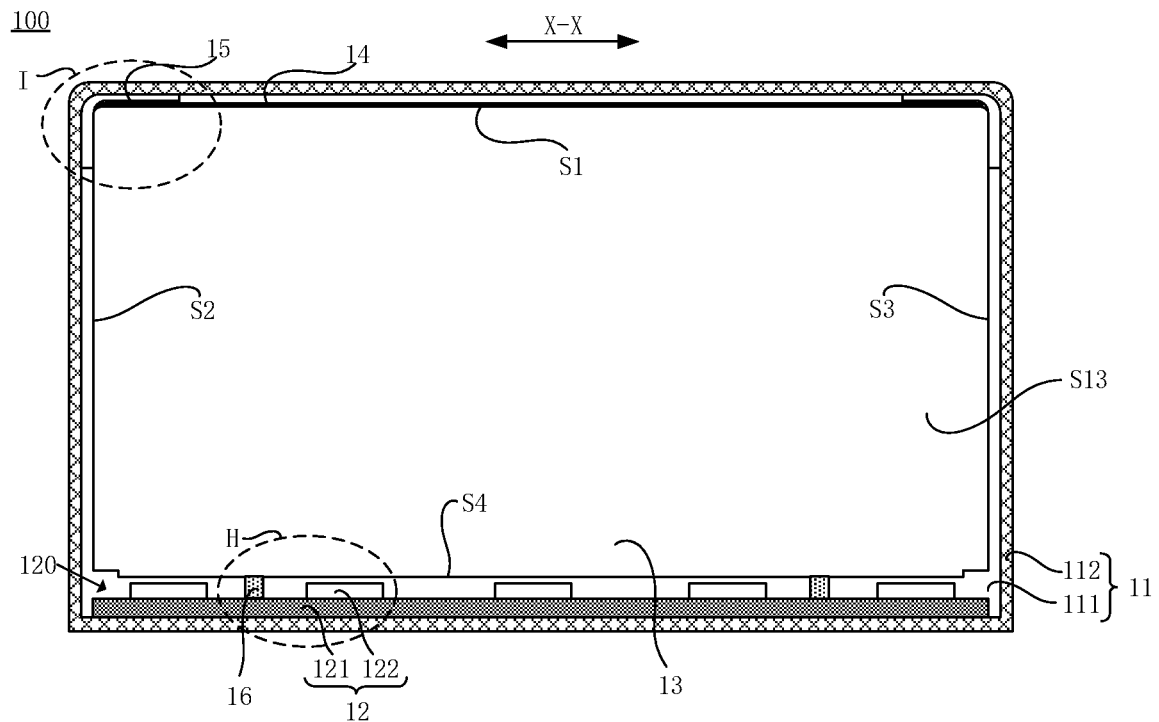
FIG. 3 is a top view of a backlight module, in accordance with embodiments of the present disclosure.

As shown in FIG. 3, the backlight module 100 at least includes a bottom frame 11, a light bar 12, a light guide plate 13, and a reflective strip 14.

Figure 4:
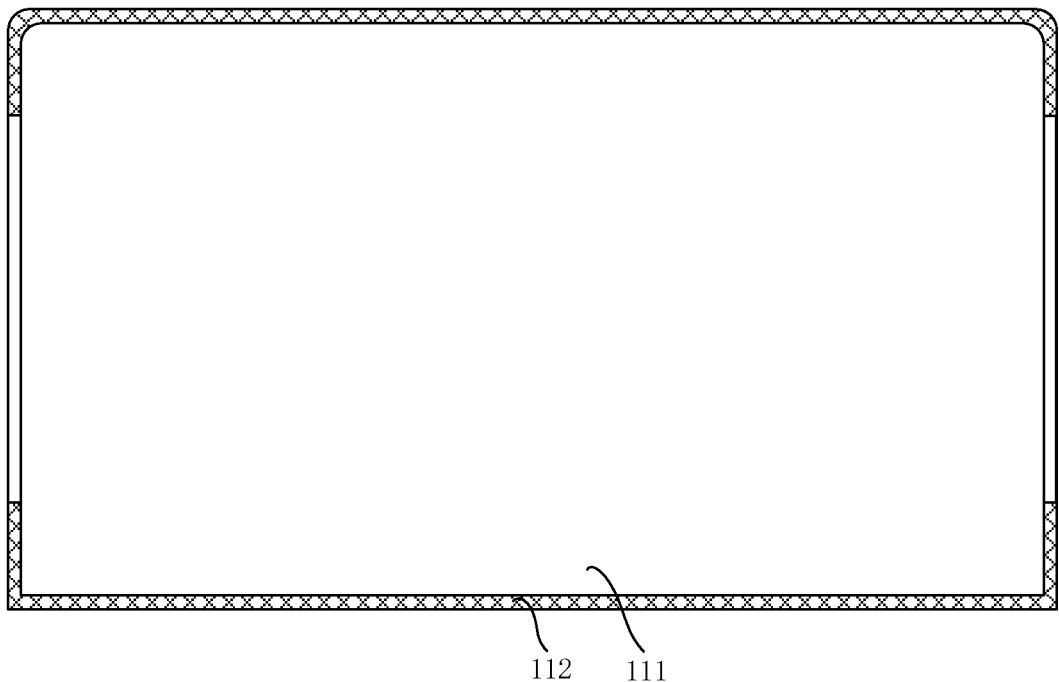
FIG. 4 is a schematic structural diagram of a bottom frame, in accordance with embodiments of the present disclosure.

The bottom frame 11 is used for accommodating elements such as the light bar 12 and the light guide plate 13. The shape of the bottom frame 11 may be selectively arranged according to actual requirements. For example, referring to FIGS. 3 and 4, the bottom frame 11 includes a back plate 111 and a side wall 112 located on a periphery of the back plate 111. The side wall 112 may be arranged as a whole around the periphery of the back plate 111, as shown in FIG. 3. Or, the side wall 112 is arranged in a local region of the periphery of the back plate 111 in a form of a plurality of sub-walls by using a split structure, as shown in FIG. 4.

The light bar 12 is located in the bottom frame 11, and is usually provided on an inner side of the side wall of the bottom frame 11. The light guide plate 13 is located on the back plate 111 of the bottom frame 11 and on a light exit side 120 of the light bar 12. The light guide plate 13 is parallel to the back plate 111, and the light guide plate 13 is a side-type light guide plate. That is, a light incident surface of the light guide plate 13 is a side surface of the light guide plate 13, and a light exit surface S13 of the light guide plate 13 is parallel to the back plate 111. An optical film such as a reflective sheet or a brightness enhancement film, a cooling fin, or the like may be further provided between the light guide plate 13 and the back plate 111. An optical film such as a diffusion sheet or a brightness enhancement film may be further provided on a surface of the light guide plate 13 away from the back plate 111.

For example, as shown in FIG. 1, the reflective sheet 17 is provided between the light guide plate 13 and the back plate 111. The diffusion sheet 18 is provided on the surface of the light guide plate 13 away from the back plate 111.

The light guide plate 13 has a plate structure. For the convenience of description, sides of the light guide plate 13 in different directions are defined as a first side surface S1, a second side surface S2, a third side surface S3, and a fourth side surface S4, respectively. Each of the second side surface S2 and the third side surface S3 intersects the first side surface S1, e.g., is perpendicular to the first side surface S1. The fourth side surface S4 is parallel to the first side surface S1, and the fourth side surface S4 is the light incident surface of the light guide plate 13.

The reflective strip 14 is attached to the first side surface S1 of the light guide plate 13 away from the light bar 12, and is able to reflect light propagating to the first side surface S1 into the light guide plate 13, so as to improve a light extraction efficiency of the light guide plate 13.

With the development of display technologies, demands of users on display devices are increasing. A "OGAP" solution is used in the backlight module 100, i.e., a movement allowance of the light guide plate 13 in the bottom frame 11 is set to be 0 mm or close to 0 mm, which is able to effectively reduce a power consumption of the backlight module 100 and improve the light extraction efficiency of the light guide plate 13.

Based on this, in the embodiments of the present disclosure, referring to FIGS. 3 to 10, the backlight module 100 further includes at least two cushion pads 15 and at least one dam 16.

The at least two cushion pads 15 are provided between the light guide plate 13 and the bottom frame 11. Each cushion pad 15 includes a first positioning portion 151 and an avoiding portion 152 disposed on the first positioning portion 151. The first positioning portion 151 and the avoiding portion 152 are arranged side by side, and extending directions of the first positioning portion 151 and the avoiding portion 152 are parallel to an extending direction of the reflective strip 14. The extending direction of the reflective strip 14 is a length direction of the reflective strip 14, as indicated by the X-X direction in FIG. 3.

An orthographic projection of the reflective strip 14 on the first side surface 51 of the light guide plate 13 is located outside an orthographic projection of the first positioning portion 151 on the first side surface 51 of the light guide plate 13. The first positioning portion 151 is in surface contact with a portion of the first side surface 51 that is non-covered by the reflective strip 14.

The orthographic projection of the reflective strip 14 on the first side surface 51 of the light guide plate 13 is partially overlapped with an orthographic projection of the avoiding portion 152 on the first side surface 51 of the light guide plate 13. The avoiding portion 152 and the reflective strip 14 have a first interval D1 therebetween.

In addition, a portion of each cushion pad 15 away from the first side surface S1 is fixedly connected, e.g., adhered, to the side wall 112 of the bottom frame 11.

The at least one dam 16 is provided on a surface of the light bar 12 proximate to the light guide plate 13. A surface of each dam 16 proximate to the light guide plate 13 is in surface contact with the fourth side surface S4 of the light guide plate 13.

Thus, the light guide plate 13 is in surface contact with the cushion pads 15 and the dam(s) 16, and an assembly of the light guide plate 13 in the bottom frame 11 is able to be accurately positioned by using the cushion pads 15 and the dam(s) 16, so as to ensure that a movement allowance of the light guide plate 13 in a first direction (i.e., a vertical direction of the first side surface S1) is 0 mm or close to 0 mm.

Referring to FIGS. 3 and 5 to 8 again, in some embodiments, the number of the cushion pads 15 is two. Each cushion pad 15 further includes a second positioning portion 153. The second positioning portion 153 of one cushion pad 15 is in surface contact with the second side surface S2 of the light guide plate 13, and the second positioning portion 153 of another cushion pad 15 is in surface contact with the third side surface S3 of the light guide plate 13. A portion of the second positioning portion 153 of each cushion pad 15 away from the light guide plate 13 is fixedly connected, e.g., adhered, to the side wall 112 of the bottom frame 11. Thus, the light guide plate 13 is in surface contact with the second positioning portions 153 of the two cushion pads 15, and the assembly of the light guide plate 13 in the bottom frame 11 is able to be further accurately positioned by using the cushion pads 15, so as to ensure that a movement allowance of the light guide plate 13 in a second direction (i.e., a vertical direction of the second side surface S2) is 0 mm or close to 0 mm.

In addition, the surface contact between the cushion pad 15 and the light guide plate 13 exhibits an interference fit. Since a size of the light guide plate 13 is large, a deformation of the light guide plate 13 caused by thermal expansion and cold contraction is also large. Therefore, in the embodiments of the present disclosure, a rigidity of the cushion pad 15 is less than a rigidity of the light guide plate 13, so that the cushion pad 15 may contract when the light guide plate 13 expands to absorb the expansion deformation of the light guide plate 13, or may expand when the light guide plate 13 contracts to compensate for the contraction deformation of the light guide plate 13. A material of the cushion pad 15 may be selectively set according to actual requirements, such as silica gel, resin or metal. In addition, structures of the first positioning portion 151 and the avoiding portion 152 of the cushion pad 15 may also be selectively arranged according to actual requirements.

Figure 6:
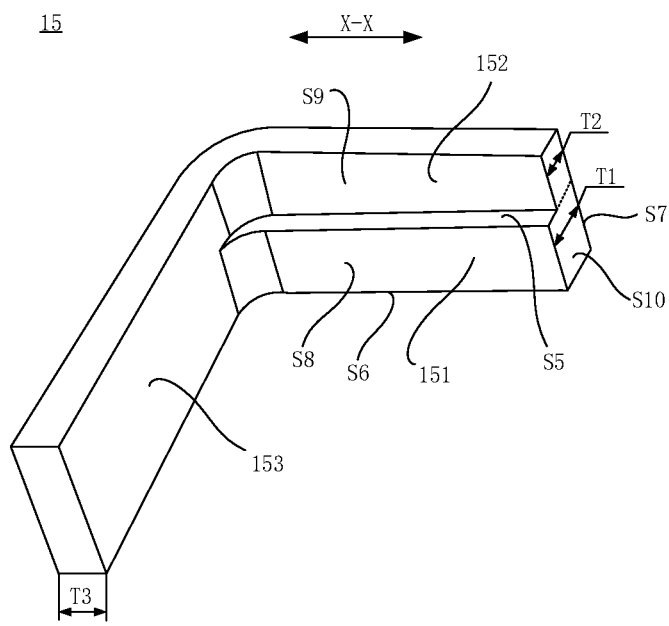
FIG. 6 is a schematic structural diagram of a cushion pad, in accordance with embodiments of the present disclosure.
Figure 8:
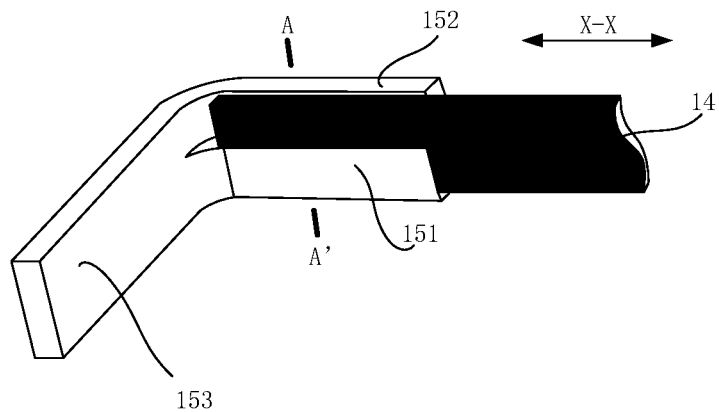
FIG. 8 is a schematic assembly diagram of a cushion pad and a reflective strip, in accordance with embodiments of the present disclosure.

In some embodiments, as shown in FIGS. 6 and 8, in each cushion pad 15, the avoiding portion 152 is located on a side of the first positioning portion 151 proximate to the light exit surface of the light guide plate 13. The light exit surface of the light guide plate 13 is the surface of the light guide plate 13 away from the back plate 111. That is, the first positioning portion 151 is located on a side of the avoiding portion 152 proximate to the back plate 111 of the bottom frame 11.

Here, the avoiding portion 152 is located on a top surface S5 of the first positioning portion 151. Both a bottom surface S6 of the first positioning portion 151 and an outer side surface S7 of the first positioning portion 151 proximate to the side wall 112 of the bottom frame 11 may be in contact with the bottom frame 11, so that a contact area between the first positioning portion 151 and the bottom frame 11 is large, thereby enhancing a support strength of the first positioning portion 151 to the light guide plate 13.

An inner side surface S8 of the first positioning portion 151 proximate to the light guide plate 13 is in surface contact with the first side surface S1 of the light guide plate 13. An inner side surface S9 of the avoiding portion 152 proximate to the light guide plate 13 and the light guide plate 13 have an interval therebetween, so that a portion of the top surface S5 of the first positioning portion 151 is not shielded by the avoiding portion 152, and this portion is capable of accommodating a portion of the reflective strip 14 along the extending direction of the reflective strip 14.

Figure 9:
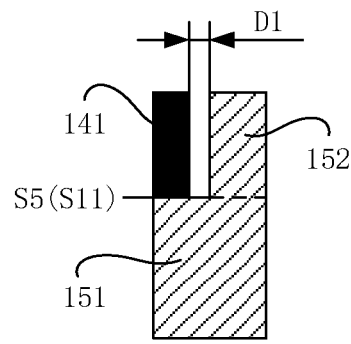
FIG. 9 is a schematic sectional view of the cushion pad and the reflective strip in FIG. 8 taken along the A-A' direction.

The interval between the avoiding portion 152 and the light guide plate 13 may be selectively set according to actual requirements. As a limit, after the reflective strip 14 is attached to the first side surface S1 of the light guide plate 13, the avoiding portion 152 and the reflective strip 14 have the first interval D1 therebetween, as shown in FIG. 9. A size of the first interval D1 may be selectively set according to actual requirements. The reflective strip 14 is attached to the first side surface S1 of the light guide plate 13, and the first interval may be left between the reflective strip 14 and the avoiding portion 152 by using the structure of the avoiding portion 152 of the cushion pad 15, so as to prevent the reflective strip 14 from being extruded by an external force or rubbed by the cushion pad 15, thereby avoiding a glue failure of the reflective strip 14.

Figure 5:
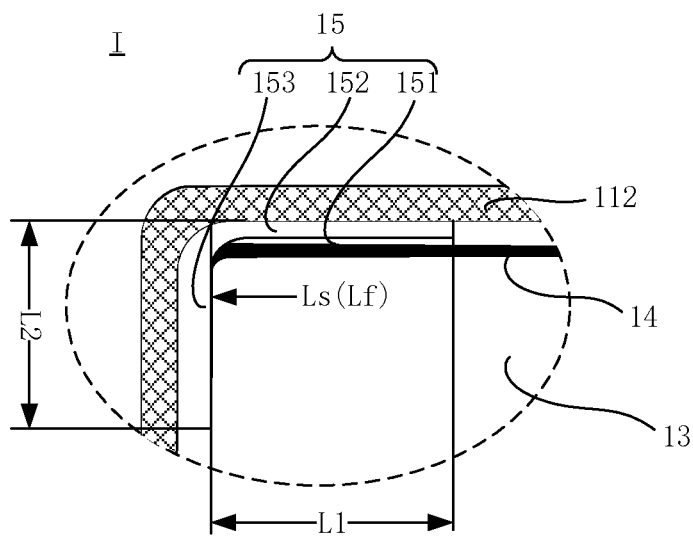
FIG. 5 is an enlarged schematic diagram of the I region in FIG. 3.

On this basis, as shown in FIGS. 3, 5 and 8, a length Lf of the reflective strip 14 along the extending direction thereof is the same as a length Ls of the first side surface S1 of the light guide plate 13 along the same direction. Here, the length Lf of the reflective strip 14 is the same as the length Ls of the first side surface S1 of the light guide plate 13, which includes a case that Lf is equal to Ls (i.e., Lf=Ls), or a case that Lf is approximately equal to Ls (i.e., a tolerance deviation exists between Lf and Ls).

The whole reflective strip 14 is attached to the first side surface S1 of the light guide plate 13. A thickness of the light guide plate 13 is much less than the length of the first side surface S1 of the light guide plate 13. The length of the reflective strip 14 is the same as or substantially the same as the length of the first side surface S1, so that the reflective strip 14 may be continuously arranged along an edge of the light exit surface of the light guide plate 13, so as to ensure a uniform light emission of a light exit region of the light guide plate 13 proximate to the first side surface S1 on a basis of a small area of the portion of the first side surface S1 that is non-covered by the reflective strip 14. That is, a brightness of a local region (i.e., a light exit region proximate to the portion of the first side surface S1 to which the reflective strip 14 is not attached) of the light guide plate 13 is prevented from being higher than a brightness of other region (i.e., a light exit region proximate to a portion of the first side surface S1 to which the reflective strip 14 is attached) of the light guide plate 13, which is beneficial to ensuring a uniform display brightness of the display device.

In addition, the small area of the portion of the first side surface S1 that is non-covered by the reflective strip 14 is further able to ensure that the reflective strip 14 reflects a lot of light transmitted to the first side surface S1 of the light guide plate 13, so as to improve the light extraction efficiency of the light guide plate 13.

Figure 7:
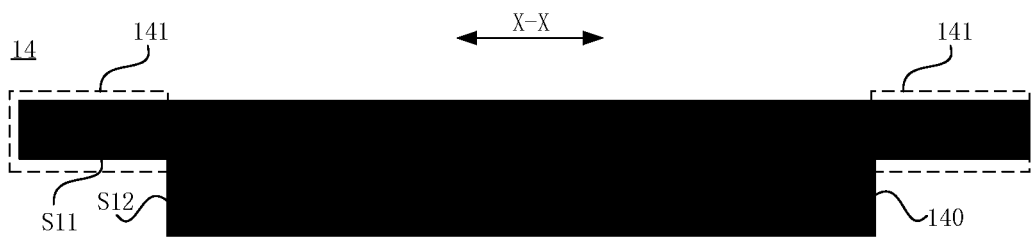
FIG. 7 is a schematic structural diagram of a reflective strip, in accordance with embodiments of the present disclosure.

In order to describe the structure of the reflective strip 14 more clearly, referring to FIG. 7, the orthographic projection of the reflective strip 14 on the first side surface S1 of the light guide plate 13 is in a T shape or a T-like shape. It will be understood that the extending direction of the reflective strip 14 is a transverse direction of the T shape. The shape of the reflective strip 14 may be regarded as that two sides of a reflective body 140 are each added an extending portion 141 along an extending direction of the reflective body 140. An orthographic projection of the extending portion 141 on the first side surface S1 is located within the orthographic projection of a corresponding avoiding portion 152 on the first side surface S1. Moreover, a bottom surface S11 of the extending portion 141 is allowed to be in surface contact with or have a very small gap from the portion of the top surface S5 of the first positioning portion 151 that is not shielded by the avoiding portion 152. In addition, a side surface S12 of the reflective strip 14 connected to the bottom surface S11 of the extending portion 141 is also allowed to be in surface contact with or have a very small gap from a side surface S10 of the first positioning portion 151 along a thickness direction. The above structure of the reflective strip 14 is able to be matched with the structure of the cushion pad 15, so as to ensure that the reflective strip 14 has a large reflecting area in a case where the reflective strip 14 is prevented from being extruded and rubbed.

In some embodiments, referring to FIG. 6 again, in a case where each cushion pad 15 includes the first positioning portion 151, the avoiding portion 152, and the second positioning portion 153, the cushion pad 15 has an L-shaped structure. Both the first positioning portion 151 and the avoiding portion 152 are connected to the second positioning portion 153 smoothly. For example, an intersection portion of the second positioning portion 153 and the first positioning portion 151 and an intersection portion of the second positioning portion 153 and the avoiding portion 152 are each provided with a rounded transition, so as to realize smooth transition, thereby facilitating slow release of the stress in a bending region of the cushion pad 15 to prevent the cushion pad 15 from being damaged due to stress concentration.

In some embodiments, referring to FIG. 6 again, the first positioning portion 151, the avoiding portion 152, and the second positioning portion 153 in each cushion pad 15 are of an integrated structure. A thickness T1 of the first positioning portion 151 is the same as a thickness T3 of the second positioning portion 153, and a thickness T2 of the avoiding portion 152 is less than the thickness T1 of the first positioning portion 151. Thus, the cushion pad 15 has a stable structure, and is convenient to manufacture and install. For example, the cushion pad 15 is formed by using a stamping process or an injection molding process.

It will be understood that a material of the dam 16 may be selected according to actual requirements, such as silica gel, resin or metal. A rigidity of the dam 16 may be less than the rigidity of the light guide plate 13, or the rigidity of the dam 16 may be greater than or equal to the rigidity of the light guide plate 13.

The rigidity of the dam 16 is less than the rigidity of the light guide plate 13, and the surface contact between the dam 16 and the light guide plate 13 exhibits an interference fit. Thus, the dam 16 may contract when the light guide plate 13 expands to absorb the expansion deformation of the light guide plate 13, or may expand when the light guide plate 13 contracts to compensate for the contraction deformation of the light guide plate 13.

Figure 10:
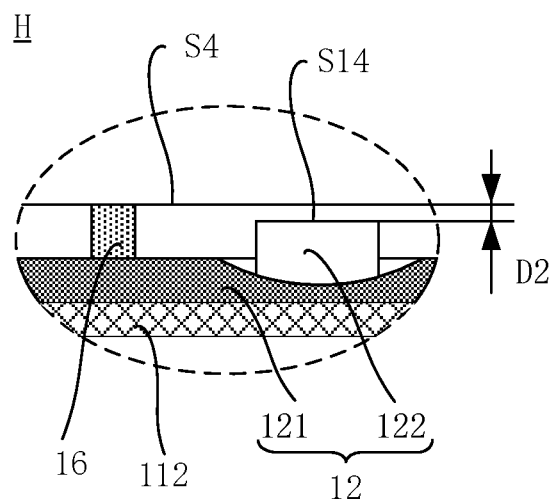
FIG. 10 is an enlarged schematic diagram of the H region in FIG. 3.

In some embodiments of the present disclosure, referring to FIGS. 3 and 10, the light bar 12 includes a circuit board 121 and a plurality of light sources 122. The circuit board 121 is fixedly connected to the side wall 112 of the bottom frame 11, e.g., is adhered to the side wall 112, or is fixedly connected to the side wall 112 through screws. The light source 122 is a point light source or a line light source. For example, the light source 122 is a light-emitting diode (LED) lamp. A lighting circuit is provided on the circuit board 121. The light sources 122 are provided on a surface of the circuit board 121 proximate to the light guide plate 13, and are connected to the lighting circuit on the circuit board 121. The lighting circuit on the circuit board 121 is energized to light the light sources 122.

In some examples, the light source 122 is the LED lamp. A portion of the circuit board 121 configured to install the LED lamp is in a bowl shape, and the bowl-shaped surface thereof is coated with a reflective layer, which is beneficial to improving a light extraction efficiency of the LED lamp.

The dam(s) 16 and the light sources 122 are located on a same side of the circuit board 121, and are fixedly connected to the circuit board 121. That is, the dam(s) 16 are fixedly provided on the surface of the circuit board 121 proximate to the light guide plate 13. The dam 16 is adhered to the circuit board 121, or the dam 16 is soldered to the circuit board 121. Taking the circuit board 121 as a reference, a height of the light source 122 exceeding the circuit board 121 is less than a height of the dam 16 exceeding the circuit board 121. The light sources 122 and the light guide plate 13 have a second interval D2 therebetween. Here, the second interval D2 refers to an interval between a top surface S14 (i.e., a plane where a highest point of the light source 122 from the circuit board 121 is located) of the light source 122 and the fourth side surface S4 of the light guide plate 13, and a size of the second interval D2 may be selectively set according to actual requirements.

In the embodiments of the present disclosure, the dam 16 is directly fixed to the circuit board 121, which facilitates installation of the light bar 12 and the light guide plate 13 in the bottom frame 11. Moreover, the dam 16 supports and positions the light guide plate 13, so that the light sources 122 and the light guide plate 13 have the second interval D2 therebetween, and abrasion between the light source 122 and the light guide plate 13 may be avoided. Thus, a problem that dust generated by abrasion falls into the bowl for installing the LED lamp to cause the LED lamp to emit yellow light does not occur.

Based on the structure of the light guide plate 13, the circuit board 121 has a long strip structure. The number of the dam(s) 16 and their arrangement positions on the circuit board 121 may be selectively set according to actual requirements.

In some examples, the number of the dams 16 is two. Along an extending direction of the circuit board 121 (the same as the extending direction X-X of the reflective strip 14), the two dams 16 are each arranged near an end of the circuit board 121. In this way, the light guide plate 13 is able to be stably supported by using the dams 16. In a case where the size of the light guide plate 13 is large, the number of the dams 16 may be increased adaptively. If the number of the dams 16 is three or more, a plurality of dams 16 are uniformly distributed along the extending direction of the circuit board 121.

In addition, in the backlight module in the above embodiments, if the circuit board 121 or the side wall 112 on which the circuit board 121 is installed has an insufficient straightness (i.e., greater than or less than an allowable straightness standard), curved portion(s) exist in the side wall 112 or the circuit board 121, which may also be compensated by the dam(s) 16, so as to well position the light guide plate 13.

In the embodiments of the present disclosure, the light guide plate 13 is accurately positioned in the bottom frame 11, so that the movement allowance of the light guide plate 13 is able to be effectively reduced or eliminated, so as to reduce an impact force to which the light guide plate 13 is subjected during a vibration test of the backlight module and reduce the abrasion of the light guide plate 13. Considering the deformation of the light guide plate 13 due to the characteristics of thermal expansion and clod contraction, the rigidity of the cushion pad 15 is required to be set appropriately. A hardness of the cushion pad 15 may be used as one of measure indexes of the rigidity of the cushion pad 15.

The hardness of the cushion pad 15 is measured by using the Shore hardness, and the hardness (Shore Hardness Type A) of the cushion pad 15 ranges from 50 HA to 60 HA, inclusive. For example, the hardness of the cushion pad 15 is any one of 50 HA, 55 HA or 60 HA.

The hardness of the cushion pad 15 is selected in a suitable range, which is able to compensate for a large deformation (including the expansion deformation or the contraction deformation) of the light guide plate 13, so as to avoid defects such as wrinkles on a display screen of the display device due to the deformation of the light guide plate 13.

In addition, in the display devices with different sizes, the thicknesses and lengths of the first positioning portion 151, the avoiding portion 152, and the second positioning portion 153 of the cushion pad 15 may be different. Here, the thickness refers to a distance between an inner side surface of a corresponding component proximate to the light guide plate 13 and an outer side surface of the corresponding component proximate to the side wall 112. The length refers to an extending dimension of a corresponding component along the vertical direction of the second side surface S2 of the light guide plate 13.

The structure of the cushion pad 15 is as described in some of the above embodiments. Referring to FIGS. 5 and 6, in a case where the first positioning portion 151, the avoiding portion 152, and the second positioning portion 153 of the cushion pad 15 are of the integrated structure, the thickness T1 of the first positioning portion 151 is the same as the thickness T3 of the second positioning portion 153, the thickness T2 of the avoiding portion 152 is less than the thickness T1 of the first positioning portion 151, and the avoiding portion 152 is formed by grooving a plate of a same thickness. Therefore, for the convenience of description, in the embodiments of the present disclosure, the cushion pad 15 will be schematically described considering the thickness T1 of the first positioning portion 151 as a thickness of the cushion pad 15 and a sum of a length L1 of the first positioning portion 151 and a length L2 of the second positioning portion 153 as a length of the cushion pad 15.

That is, the thickness and length of the cushion pad 15 may be set according to the size of the display device.

In an example where a size of the liquid crystal display panel 200 in the display device is 23.8 inches, in the embodiments of the present disclosure, a plurality of tests were performed to verify the cushion pads 15 with different thicknesses and lengths. For example, by using the cushion pads 15 with a thickness of 0.7 mm and a length of 5 mm as a first group, the cushion pads 15 with a thickness of 0.7 mm and a length of 20 mm as a second group, the cushion pads 15 with a thickness of 1.1 mm and a length of 5 mm as a third group, the cushion pads 15 with a thickness of 1.1 mm and a length of 20 mm as a fourth group, in combination with the hardness of the cushion pad 15 (e.g., 50 HA and 60 HA), the tests were performed in a case where an expansion amount of the light guide plate 13 is 0.30 mm, and test data may be obtained as shown in Table 1.

compression ratios, and are able to well compensate for the expansion of the light guide plate 13.

In the display devices of other sizes, the structural size of the cushion pad 15 may be selected appropriately with reference to the above tests.

In addition, in the embodiments of the present disclosure, a plurality of tests were performed on values of the first interval D1 and the second interval D2.

It is verified through the tests that the value of the first interval D1 between the avoiding portion 152 of the cushion pad 15 and the reflective strip 14 is preferably close to or equal to 0.10 mm. Thus, the first interval D1 may not only prevent the reflective strip 14 from being wrinkled due to the extrusion of the cushion pad 15, but also avoid a light leakage or an influence on the accurate positioning of the light guide plate 13 due to an excessive interval between the reflective strip 14 and the avoiding portion 152.

It is verified through the tests that the value of the second interval D2 between the light source 122 and the fourth side surface S4 of the light guide plate 13 is preferably close to or equal to 0.05 mm. For example, the value of D2 is in an open interval of 0.045 mm to 0.055 mm. In this way, the second interval D2 may not only effectively avoid the abrasion between the light source 122 and the light guide plate 13, but also improve a light incident efficiency of the light guide plate 13 to a great extent, so as to ensure the light extraction efficiency of the light guide plate 13, which is beneficial to improving the display brightness of the display device and reducing the energy consumption of the display device.

The structure of the backlight module 100 is as described above. In the embodiments of the present disclosure, a plurality of vibration tests were further performed on the backlight module 100 to verify the abrasion of the light guide plate 13 in a vibration test (e.g., Packing-VIB test, i.e., vibration test under a condition of a packing material). It is verified through the tests that the backlight module 100 in the embodiments of the present disclosure has good stability and reliability.

In addition, the display device 1000 in the embodiments of the present disclosure includes a display device without a bezel or a display device with a narrow bezel. The side wall 112 of the bottom frame 11 in the backlight module 100 is thin, which does not adversely affect non-bezel display or narrow-bezel display of the display device.

TABLE 1

| Hardness (HA) | Thickness (mm) | Length (mm) | Compression value (mm) | Compression ratio | Evaluation of compression ratio | Expansion amount of light guide plate (mm) | Whether suitable for use |
|---|---|---|---|---|---|---|---|
| 50 | 1.1 | 20 | 0.41 | 36.90% |  | 0.30 | OK |
| 50 | 1.1 | 5 | 0.56 | 50.77% |  | 0.30 | OK |
| 50 | 0.7 | 20 | 0.26 | 36.89% |  | 0.30 | NG |
| 50 | 0.7 | 5 | 0.38 | 54.21% | Optimal | 0.30 | OK |
| 60 | 1.1 | 20 | 0.36 | 32.68% | Inferior | 0.30 | OK |
| 60 | 1.1 | 5 | 0.58 | 53.06% | Suboptimal | 0.30 | OK |
| 60 | 0.7 | 20 | 0.22 | 31.25% | Worst | 0.30 | NG |
| 60 | 0.7 | 5 | 0.37 | 52.22% |  | 0.30 | OK |

By analyzing the data in Table 1, it can be seen that in the solution in which the hardness of the cushion pad 15 is 50 HA, the thickness of the cushion pad 15 is 0.7 mm, and the length of the cushion pad 15 is 5 mm, and the solution in which the hardness of the cushion pad 15 is 60 HA, the thickness of the cushion pad 15 is 1.1 mm, and the length of the cushion pad 15 is 5 mm, the cushion pads 15 have good In the description of the above embodiments, the specific features, structures, materials or characteristics may be combined in any one or more embodiments or examples in any suitable manner.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A backlight module, comprising:
a light bar;
a light guide plate located on a light exit side of the light bar, the light guide plate including a first side surface away from the light bar;
a reflective strip attached to the first side surface;
at least two cushion pads, each cushion pad including a first positioning portion and an avoiding portion disposed on the first positioning portion, wherein
an orthographic projection of the reflective strip on the first side surface is located outside an orthographic projection of the first positioning portion on the first side surface, and the orthographic projection of the reflective strip on the first side surface is partially overlapped with an orthographic projection of the avoiding portion on the first side surface;
the first positioning portion is in surface contact with a portion of the first side surface that is non-covered by the reflective strip, and the avoiding portion and the reflective strip have a first interval therebetween.

2. The backlight module according to claim 1, wherein the avoiding portion is located on a side of the first positioning portion proximate to a light exit surface of the light guide plate.

3. The backlight module according to claim 2, wherein
extending directions of the first positioning portion and the avoiding portion are parallel to an extending direction of the reflective strip;
a length of the reflective strip along the extending direction of the reflective strip is same as a length of the first side surface along the same direction.

4. The backlight module according to claim 1, wherein the light guide plate further includes a second side surface and a third side surface that intersect the first side surface;
a number of the cushion pads is two, and each cushion pad further includes a second positioning portion, wherein a second positioning portion of one cushion pad is in surface contact with the second side surface, and a second positioning portion of another cushion pad is in surface contact with the third side surface.

5. The backlight module according to claim 1, further comprising at least one dam, wherein the light guide plate further includes a fourth side surface that is parallel to the first side surface;
the at least one dam is disposed on a surface of the light bar proximate to the light guide plate; a surface of the at least one dam proximate to the light guide plate is in surface contact with the fourth side surface of the light guide plate.

6. The backlight module according to claim 5, wherein the light bar includes a circuit board and a plurality of light sources;
the plurality of light sources are disposed on a surface of the circuit board proximate to the light guide plate, and are connected to a lighting circuit in the circuit board;
the at least one dam and the plurality of light sources are located on a same side of the circuit board, and the at least one dam is fixedly connected to the circuit board;
a height of the plurality of light sources exceeding the circuit board is less than a height of the at least one dam exceeding the circuit board, so that the plurality of light sources and the fourth side surface have a second interval therebetween.

7. The backlight module according to claim 4, wherein both the first positioning portion and the avoiding portion are connected to the second positioning portion smoothly.

8. The backlight module according to claim 4, wherein the first positioning portion, the avoiding portion, and the second positioning portion are of an integrated structure.

9. The backlight module according to claim 1, wherein a rigidity of each cushion pad is less than a rigidity of the light guide plate.

10. A display device, comprising the backlight module according to claim 1 and a liquid crystal display panel disposed on a light exit side of the backlight module.

11. The backlight module according to claim 1, wherein the reflective strip includes a reflective body and two extending portions, one of the two extending portions is disposed on a side of the reflective body along an extending direction of the reflective body, and another one of the two extending portions is disposed on an opposite side of the reflective body along the extending direction of the reflective body; an orthographic projection of each extending portion on the first side surface is located within an orthographic projection of a corresponding avoiding portion on the first side surface, and the extending portion and the corresponding avoiding portion have the first interval therebetween.

12. The backlight module according to claim 5, wherein a rigidity of each dam is less than a rigidity of the light guide plate.

13. The backlight module according to claim 6, wherein the at least one dam includes two dams, a distance between each dam and an edge of the circuit board proximate to the dam along an extending direction of the circuit board is less than a distance between the two dams.

14. The backlight module according to claim 6, wherein the at least one dam includes more than two dams that are uniformly distributed along an extending direction of the circuit board.

15. The backlight module according to claim 1, further comprising a bottom frame, the bottom frame including a back plate and a side wall located on a periphery of the back plate, wherein
the light guide plate is located on the back plate, and a light exit surface of the light guide plate is parallel to the back plate.

16. The backlight module according to claim 15, wherein the at least two cushion pads are disposed between the light guide plate and the bottom frame, and a portion of each cushion pad away from the first side surface is fixedly connected to the side wall of the bottom frame.

17. The backlight module according to claim 9, wherein a hardness of the cushion pad ranges from 50 HA to 60 HA, inclusive.

* * * * *